United States Patent
Kim et al.

(10) Patent No.: US 12,175,962 B2
(45) Date of Patent: Dec. 24, 2024

(54) APPARATUS AND METHOD FOR CONTROLLING VEHICLE SOUND

(71) Applicants: Hyundai Motor Company, Seoul (KR); Kia Corporation, Seoul (KR); SEOUL NATIONAL UNIVERSITY R&DB FOUNDATION, Seoul (KR)

(72) Inventors: Ki Chang Kim, Gyeonggi-do (KR); Dong Chul Park, Gyeonggi-do (KR); Myung Hwan Yun, Seoul (KR); Sung Ho Kim, Seoul (KR)

(73) Assignees: Hyundai Motor Company, Seoul (KR); Kia Corporation, Seoul (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 17/824,093

(22) Filed: May 25, 2022

(65) Prior Publication Data

US 2023/0186893 A1    Jun. 15, 2023

(30) Foreign Application Priority Data

Dec. 14, 2021    (KR) .......................... 10-2021-0178959

(51) Int. Cl.
*G10K 15/02*    (2006.01)
*B60Q 9/00*    (2006.01)
*H04R 3/00*    (2006.01)

(52) U.S. Cl.
CPC .............. *G10K 15/02* (2013.01); *H04R 3/00* (2013.01); *B60Q 9/00* (2013.01); *H04R 2430/01* (2013.01); *H04R 2499/13* (2013.01)

(58) Field of Classification Search
CPC ...... G10K 15/02; H04R 3/00; H04R 2430/01; H04R 2499/13; B60Q 9/00
See application file for complete search history.

(56) References Cited

U.S. PATENT DOCUMENTS

| | | | |
|---|---|---|---|
| 6,236,968 B1 * | 5/2001 | Kanevsky | G10L 17/26 704/275 |
| 9,451,380 B2 | 9/2016 | Inou et al. | |
| 10,068,620 B1 * | 9/2018 | Lin | G01C 21/3629 |
| 10,625,671 B2 | 4/2020 | Lee et al. | |
| 10,878,787 B2 | 12/2020 | Hampiholi et al. | |
| 2003/0158644 A1 * | 8/2003 | Basson | G08B 13/19647 701/49 |

(Continued)

FOREIGN PATENT DOCUMENTS

KR    2017-0014050 A    2/2017
KR    2019-0042912 A    4/2019

(Continued)

*Primary Examiner* — Daniel R Sellers
(74) *Attorney, Agent, or Firm* — Fox Rothschild LLP

(57) ABSTRACT

An apparatus and a method for controlling a vehicle sound are provided. The apparatus a detection device that detects driving information and drive mode setting information and a processing device electrically connected with the detection device. The processing device determines an emotional state of a driver based on at least one of the driving information or the drive mode setting information, determines a sound concept depending on the emotional state of the driver, and controls a vehicle sound depending on the sound concept.

12 Claims, 8 Drawing Sheets

(56) References Cited

U.S. PATENT DOCUMENTS

| | | | |
|---|---|---|---|
| 2004/0209594 A1* | 10/2004 | Naboulsi | B60R 11/0264 |
| | | | 455/403 |
| 2015/0053066 A1* | 2/2015 | Hampiholi | G06V 20/597 |
| | | | 84/602 |
| 2017/0080856 A1* | 3/2017 | Enomoto | B60Q 9/00 |
| 2017/0267251 A1* | 9/2017 | Roberts | A61B 5/18 |
| 2018/0268805 A1* | 9/2018 | Niibe | H04R 1/28 |
| 2019/0111839 A1 | 4/2019 | Lee et al. | |
| 2022/0357912 A1* | 11/2022 | Kim | G16H 20/70 |

FOREIGN PATENT DOCUMENTS

| | | |
|---|---|---|
| KR | 102020598 B1 | 9/2019 |
| KR | 102131391 B1 | 7/2020 |
| KR | 10-2022-0152829 A | 11/2022 |

\* cited by examiner

APPARATUS AND METHOD FOR CONTROLLING VEHICLE SOUND

CROSS-REFERENCE TO RELATED APPLICATION

This application claims the benefit of priority to Korean Patent Application No. 10-2021-0178959, filed in the Korean Intellectual Property Office on Dec. 14, 2021, the entire contents of which are incorporated herein by reference.

TECHNICAL FIELD

The present disclosure relates to an apparatus and a method for controlling a vehicle sound.

BACKGROUND

Modern people are exposed to a lot of stress in their daily life. When such stress is accumulated, it may appear as a psychological or physiological symptom in the body. Thus, there has been a growing interest in a management method for suitably managing stress in daily life. Therefore, there has been an increase in demand for content capable of helping people manage their stress.

SUMMARY

An aspect of the present disclosure provides an apparatus and a method for controlling a vehicle sound to actively adjust volume, a tone, and a sound image of the sound based on driving information and driver emotion information.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling a vehicle sound may include a detection device that detects driving information and drive mode setting information and a processing device electrically connected with the detection device. The processing device may determine an emotional state of a driver based on at least one of the driving information or the drive mode setting information, may determine a sound concept depending on the emotional state of the driver, and may control a vehicle sound depending on the sound concept.

The sound concept suitably may be established for example as one, two or three types or more based on driver emotion modeling. In certain aspects, the sound concept suitably may be established as three types based on driver emotion modeling.

The vehicle sound may include for example a warning sound and a virtual sound.

The processing device suitably may control volume of the vehicle sound based on vehicle environment information, may control a tone of the vehicle sound based on the sound concept, and may control a sound image of the vehicle sound with regard to an exciting force according to a frequency of the vehicle sound.

The processing device suitably may include a feedforward calculator that calculates a volume correction value according to the sound concept and a volume correction value according to the vehicle environment information and a volume control device including a control valve that determines a volume adjustment value of the vehicle sound by reflecting the volume correction values. The control valve suitably may adjust volume of the vehicle sound with regard to a sound pressure difference between the vehicle sound and background noise.

The control valve suitably may finally correct the volume adjustment value with regard to previously stored volume weight information for each vehicle class.

The processing device suitably may perform at least one of pitch control, gain control, accelerator position sensor (APS) control, frequency filtering, Shepard layer control, or volume adjustment for the vehicle sound.

The processing device suitably may synthesize low-frequency excitation, mid-frequency excitation, and/or high-frequency excitation of a sound source of the vehicle sound and suitably may linearize the synthesized low-frequency excitation, mid-frequency excitation, and/or high-frequency excitation.

The processing device suitably may generate a tactile signal based on the vehicle sound.

According to another aspect of the present disclosure, a method for controlling a vehicle sound may include receiving driving information and drive mode setting information, determining an emotional state of a driver based on at least one of the driving information or the drive mode setting information, determining a sound concept depending on the emotional state of the driver, and controlling a vehicle sound depending on the sound concept. Such method suitably may include use of a processing device for example electrically connected with a detection device.

The sound concept suitably may be established for example as one, two or three types or more based on driver emotion modeling. In certain aspects, the sound concept suitably may be established as three types based on driver emotion modeling.

The vehicle sound suitably may include a warning sound and/or a virtual sound, or other sound.

The controlling of the vehicle sound suitably may include controlling volume of the vehicle sound based on vehicle environment information, controlling a tone of the vehicle sound based on the sound concept, and controlling a sound image of the vehicle sound with regard to an exciting force according to a frequency of the vehicle sound.

The controlling of the volume of the vehicle sound suitably may include calculating, by a feedforward calculator, a volume correction value according to the sound concept and a volume correction value according to the vehicle environment information and determining, by a control valve, a volume adjustment value of the vehicle sound by reflecting the volume correction values.

The controlling of the volume of the vehicle sound suitably may further include adjusting, by the control valve, volume of the vehicle sound with regard to a sound pressure difference between the vehicle sound and background noise.

The controlling of the volume of the vehicle sound suitably may further include finally correcting, by the control valve, the volume adjustment value with regard to previously stored volume weight information for each vehicle class.

The controlling of the tone of the vehicle sound suitably may include performing at least one of pitch control, gain control, accelerator position sensor (APS) control, frequency filtering, Shepard layer control, or volume adjustment for the vehicle sound.

The controlling of the sound image of the vehicle sound suitably may include synthesizing low-frequency excitation, mid-frequency excitation, and/or high-frequency excitation of a sound source of the vehicle sound and linearizing the synthesized low-frequency excitation, mid-frequency excitation, and/or high-frequency excitation.

The controlling of the vehicle sound suitably may include generating a tactile signal based on the vehicle sound.

Further provided are vehicles that comprise apparatus and/or methods as disclosed herein, including a passenger vehicle, truck or other vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
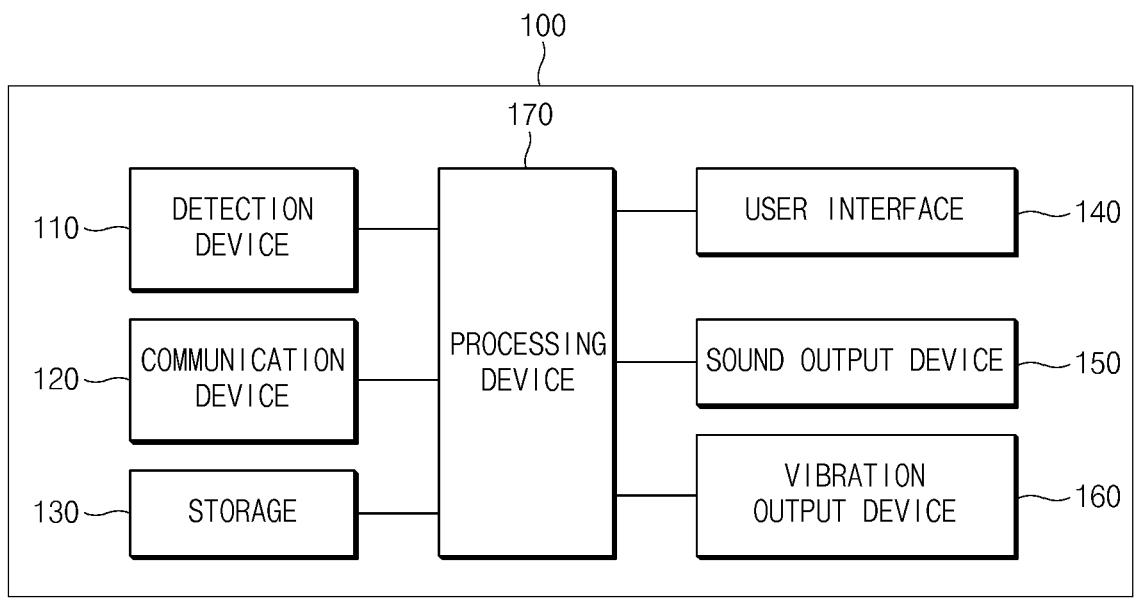
FIG. 1 is a block diagram illustrating a configuration of an apparatus for controlling a vehicle sound according to embodiments of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for controlling a vehicle sound according to embodiments of the present disclosure.

An apparatus 100 for controlling a vehicle sound may be mounted on an electrification vehicle and/or an autonomous vehicle such as an electric vehicle (EV), a plug-in hybrid electric vehicle (PHEV), and/or a hybrid electric vehicle (HEV). The apparatus 100 for controlling the vehicle sound may adjust and output at least one of volume, a tone, or a sound image of a vehicle sound based on at least one of driving information or drive mode setting information. The vehicle sound may include a warning sound, such as a start on and off sound, a battery discharge warning sound, a low battery warning sound, and/or a warning sound for not wearing the seat belt, and/or a virtual sound, such as a virtual engine sound for pedestrian safety, an acceleration sound according to slow acceleration and rapid acceleration in an actual vehicle driving environment, and/or a constant speed sound considering auto cruise control.

As shown in FIG. 1, the apparatus 100 for controlling the vehicle sound may include a detection device 110, a communication device 120, a storage 130, a user interface 140, a sound output device 150, a vibration output device 160, a processing device 170, and the like.

The detection device 110 may detect driving information of a driver, drive mode setting information, and environmental information, that is, vehicle interior environment information and/or vehicle exterior environment information. The detection device 110 may detect driving information, such as a vehicle speed, motor revolutions per minute (RPM), an accelerator pedal opening amount, accelerator pedal responsiveness, lane departure, vehicle collision, and/or an inter-vehicle distance, using sensors and/or electronic control units (ECUs) mounted on the vehicle. A microphone, a camera (or an image sensor), a distance sensor, a wheel speed sensor, an advanced driver assistance system (ADAS) sensor, a 3-axis accelerometer, an inertial measurement unit (IMU), and/or the like may be used as the sensors. The ECUs may be a motor control unit (MCU), a vehicle control unit (VCU), and/or the like.

The communication device 120 may assist the apparatus 100 for controlling the vehicle sound to communicate with an ECU mounted on the vehicle and/or an external electronic device (e.g., a terminal, a server, or the like). The communication device 120 may include a wireless communication circuit (e.g., a cellular communication circuit, a short range wireless communication circuit, and/or a global navigation satellite system (GNSS) communication circuit), a wired communication circuit (e.g., a local area network (LAN) communication circuit and/or a power line communication circuit), a vehicle communication circuit (e.g., a controller area network (CAN) communication circuit, a local interconnect network (LIN) communication circuit, and an Ethernet communication circuit), or the like.

The storage 130 may store an emotion recognition model, a sound design algorithm, a volume setting algorithm, volume control logic, tone control logic, sound image control logic, and/or the like. A sound volume (or level) for each vehicle class based on driver emotion modeling and a noise weight may be corrected and applied to the volume setting algorithm in a feedforward manner. Furthermore, the storage 130 may store vehicle sounds such as a warning sound and a virtual sound and may store an order table, various pieces of setting information, and/or the like.

The storage 130 may be a non-transitory storage medium which stores instructions executed by the processing device 170. The storage 130 may include at least one of storage media such as a random access memory (RAM), a static RAM (SRAM), a read only memory (ROM), a programmable ROM (PROM), an electrically erasable and programmable ROM (EEPROM), an erasable and programmable ROM (EPROM), a hard disk drive (HDD), a solid state disk (SSD), an embedded multimedia card (eMMC), and/or a universal flash storage (UFS).

The user interface 140 may assist the apparatus 100 for controlling the vehicle sound to interact with a user. The user interface 140 may generate data according to manipulation of the user and may output visual information, a tactile signal, and/or the like depending on an instruction of the processing device 170. For example, the user interface 140 may generate data (or a signal) for selecting and setting a drive mode depending on a user input and may output information indicating that the setting of the drive mode is completed. The user interface 140 may include at least one of input and output devices such as a keyboard, a keypad, a button, a switch, a touch pad, a microphone, a touch screen, a display, and/or a speaker.

The sound output device 150 may output an audible signal, that is, a vehicle sound (or a healing sound) to the interior and/or exterior of the vehicle. The sound output device 150 may include a digital signal processor (DSP), microprocessors, and/or the like. The sound output device 150 may output a vehicle sound to speakers mounted on the inside of the vehicle. Furthermore, the sound output device 150 may output a vehicle sound to speakers (external amplifiers) mounted on the outside of the vehicle.

The vibration output device 160 may control a vibrator to output a tactile signal. The vibrator may be installed in a steering wheel, a cushion of a seat, a backrest, a leg rest, and/or the like and a plurality of vibrators may be mounted at different positions. The vibration output device 160 may adjust a vibration intensity, a vibration direction, a vibration frequency, the amount of vibration, and/or the like under control of the processing device 170.

The processing device 170 may be electrically connected with the respective components 110 to 160. The processing device 170 may identify an emotional state of a user (e.g., a driver or the like) using driving information and may adjust at least one of volume, a tone, or a sound image of the vehicle sound depending on the identified emotional state of the user. The vehicle sound adjusted by the processing device 170 may be provided as a healing sound to the user. The processing device 170 may include at least one of processing devices such as an application specific integrated circuit (ASIC), a digital signal processor (DSP), programmable logic devices (PLD), field programmable gate arrays (FPGAs), a central processing unit (CPU), microcontrollers, and/or microprocessors.

The processing device 170 may receive the driving information, the drive mode setting information, vehicle environment information (e.g., interior environment information and exterior environment information), and/or the like from the detection device 110. The drive mode may be divided into an ECO mode, a COMFORT mode, a SPORTS mode, a SMART mode (or a personalization setting mode), and the like.

The processing device 170 may determine an emotional state of the driver based on the driving information. The processing device 170 may derive driver emotion using a persona technique. The processing device 170 may determine a sound concept depending to the emotional state of the driver. In other words, the processing device 170 may establish three types of sound concepts using driver emotion modeling. The sound concept based on the driver emotion modeling may be divided into a cultured sound or harmony sound concept, an entertaining sound or fun driving sound concept, an adaptable sound or context awareness sound concept, and/or the like. The cultured sound or harmony sound concept may prefer a comfortable and soft harmonious sound with a sense of mid-bass and high-quality. The entertaining sound or fun driving sound concept may prefer a fun futuristic sound. The adaptable sound or context awareness sound concept may prefer a sound which changes depending on the user's mood. The processing device 170 may select one of three types of sound concepts based on driver emotion modeling based on the driving information received from the detection device 110.

The processing device 170 may select one of three types of sound concepts based on the driver emotion modeling as a default concept (or a default value) based on the drive mode setting information by the driver. In other words, when the driver selects a drive mode, the processing device 170 may determine a sound concept based on driver emotion modeling corresponding to the selected drive mode. For example, when the driver selects the ECO mode, the processing device 170 may determine that the driver prefers a quiet condition to determine the sound concept as a typical sound or a default sound such that the vehicle may travel in the quiet condition. When the driver selects the COMFORT mode, the processing device 170 may determine the cultured sound or harmony sound concept as a sound concept. When the driver selects the SPORTS mode, the processing device 170 may determine the entertaining sound or fun driving sound as a sound concept. When the driver selects the SMART mode, the processing device 170 may determine the adaptable sound or context awareness sound, for providing a sound changed according to a user mood by means of personalization settings, as a sound concept.

The processing device 170 may provide an emotional care solution based on vehicle environment information based on the determined sound concept. In other words, the processing device 170 may prescribe a healing sound and vibration according to vehicle environment information based on the determined sound concept. The verification of the emotional care solution may be performed by emotion evaluation and comparison by a virtual reality (VR) simulator and actual vehicle environment driving evaluation.

Furthermore, the processing device 170 may optimize volume, a tone, and a sound image of the vehicle sound depending on a sound design methodology. The processing device 170 may adjust at least one of volume, a tone, or a sound image of the vehicle sound using volume control logic, tone control logic, and/or sound image control logic to generate a healing sound. The processing device 170 may play and output the generated healing sound. At this time, the processing device 170 may adjust vibration based on the vehicle environment information.

The processing device 170 may adjust the vehicle sound based on a volume, tone, and/or sound image adjustment value by the user, a head unit signal, and/or driving information in the cultured sound or harmony sound or the entertaining sound or fun driving sound. The head unit signal may be vehicle environment information (e.g., interior environment information and/or exterior environment information) provided from the head unit.

The processing device 170 may control volume of the vehicle sound depending on the volume control logic. The processing device 170 may calculate a volume correction value according to the sound concept based on the driver emotion modeling and a volume correction value according to the vehicle environment information. The processing device 170 may determine a volume correction value of the vehicle sound using feedforward calculation and a control valve.

The processing device 170 may control a tone of the vehicle sound using the tone control logic. The processing device 170 may generate a virtual sound to be suitable for a driving situation (or a driving environment). The processing device 170 may adjust and generate a virtual sound based on predetermined sound design information. The processing device 170 may perform pitch control, gain control, accelerator position sensor (APS) control, frequency filtering, Shepard layer control, volume adjustment, and/or the like for the vehicle sound. The pitch control is a function of adjusting pitch of the vehicle sound, which is a first step for volume guide. The pitch control is a function of assisting in performing a vehicle sound design in a virtual environment by means of tuning of a pitch rate and a grain level according to RPM. The gain control is a function of changing a tone and adjusting resistance, which is a second step for psycho-acoustics-based auditory evaluation. The APS control is a function of adjusting an accelerator pedal opening amount, which is a third step for a sound design with regard to a constant speed or acceleration driving condition of the actual vehicle. The frequency filtering may adjust a playback frequency band of the sound. The Shepard layer control is a function of generating a second sound source and incidentally adjusting an adjustment region of the sound source, which may store and correct a sound source by means of waveform audio format (WAV) settings.

The processing device 170 may control a sound image of the vehicle sound depending on the sound image control logic. The processing device 170 may synthesize low-frequency excitation, mid-frequency excitation, and high-frequency excitation of the sound source of the vehicle sound. The processing device 170 may linearize the synthesized low-frequency excitation, mid-frequency excitation, and high-frequency excitation.

Figure 2:
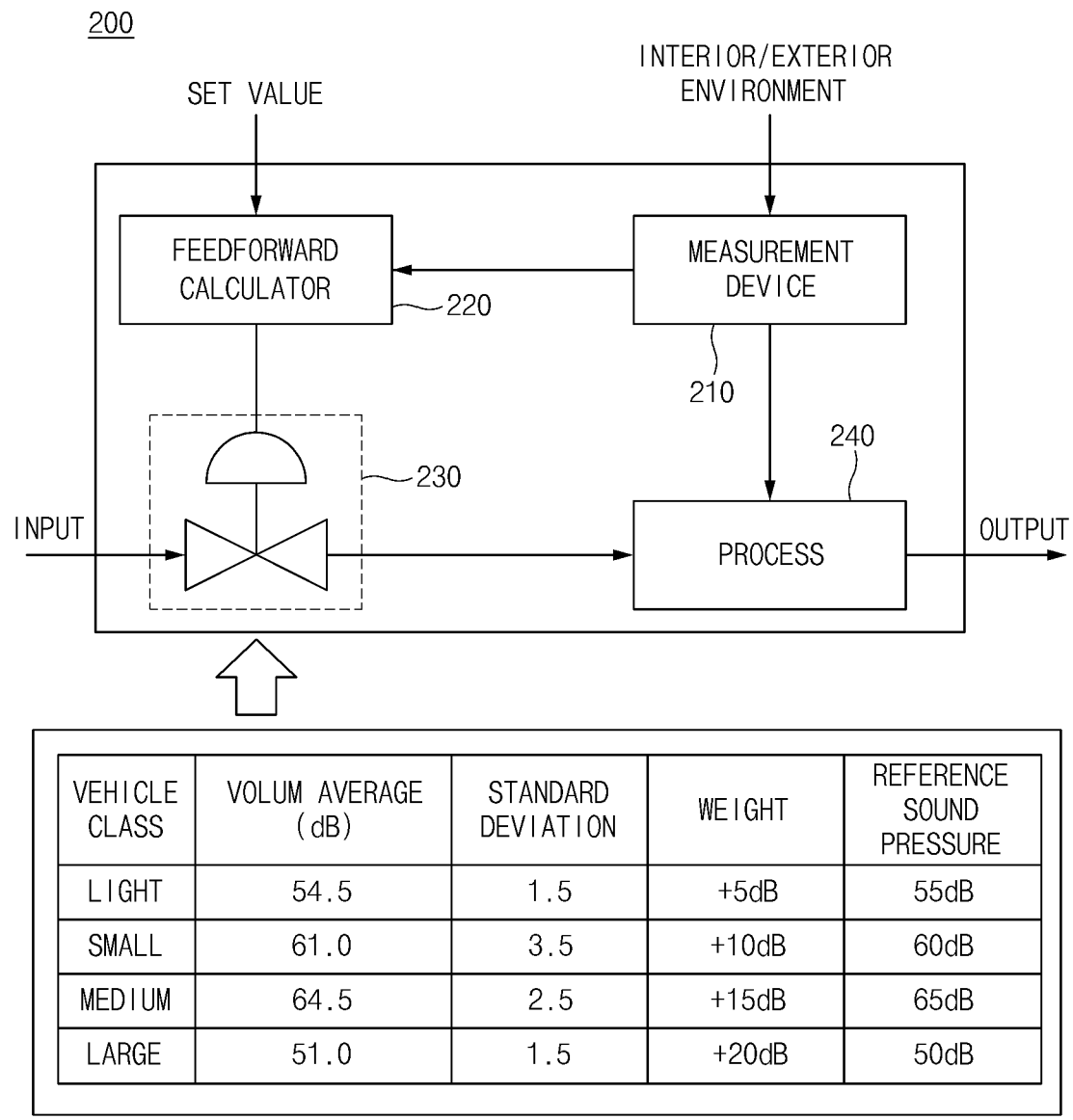
FIG. 2 is a block diagram illustrating a volume control device according to embodiments of the present disclosure.
Figure 3:
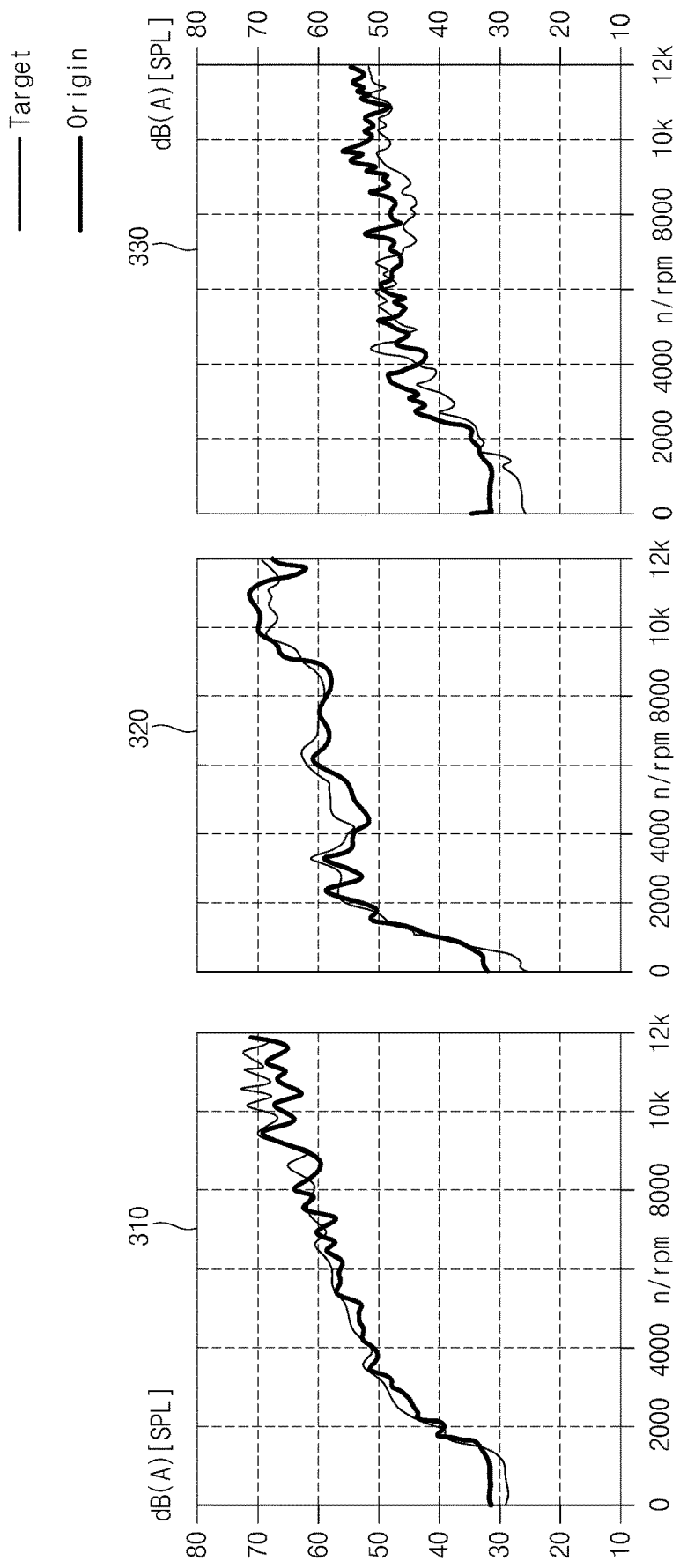
FIG. 3 is a drawing illustrating a sound design example based on driver emotion modeling according to embodiments of the present disclosure.

FIG. 2 is a block diagram illustrating a volume control device according to embodiments of the present disclosure. FIG. 3 is a drawing illustrating a sound design example based on driver emotion modeling according to embodiments of the present disclosure.

A volume control device 200 may adjust sound volume (or magnitude) with regard to an interior environment and/or an exterior environment (hereinafter, referred to as an "interior/exterior environment") of a vehicle. Such a volume control device 200 may include a measurement device 210, a feedforward calculator 220, a control valve 230, and a process 240.

The measurement device 210 may measure interior environment information and/or exterior environment information of the vehicle. The measurement device 210 may deliver the measured interior environment information and/or the measured exterior environment information (or the measured interior/exterior environment information) to the feedforward calculator 220 and the process 240.

The feedforward calculator 220 may calculate a volume correction value based on a set value and a measurement value measured by the measurement device 210. Herein, the set value may be a predetermined sound type (or sound concept) based on driver emotion modeling. The feedforward calculator 220 may calculate a volume correction value according to the sound type based on the driver emotion modeling. For example, when the sound concept is set to a cultured sound or harmony sound, the feedforward calculator 220 may calculate a volume correction value of +3 dB for adjusting default sound volume to cultured sound or harmony sound volume. When the sound concept is set to an entertaining sound or fun driving sound, the feedforward calculator 220 may calculate a volume correction value of +7 dB for adjusting the default sound volume to entertaining sound volume. The feedforward calculator 220 may calculate a volume correction value according to the interior/exterior environment information. For example, the feedforward calculator 220 may add ±5 dB to 10 dB to environment noise volume to calculate vehicle sound volume. The feedforward calculator 220 may deliver the calculated volume correction values to the control valve 230.

The control valve 230 may receive sound pressure of a vehicle sound adjusted in multiple stages according to interior/exterior environment information. When a sound pressure difference between the vehicle sound and background noise (e.g., volume of a mobile phone or the like) is less than or equal to a predetermined reference value (e.g., 3 dB to 5 dB), the control valve 230 may fail to adjust sound pressure of the vehicle sound. In other words, when the sound pressure difference between the vehicle sound and the background noise is less than or equal to the reference value, the control valve 230 may set the state of the control valve 230 to off. When the sound pressure difference between the vehicle sound and the background noise is greater than the reference value, the control valve 230 may adjust sound pressure in units of a predetermined reference value based on the sound pressure between the virtual sound and the background noise to increase or decrease volume of the vehicle sound.

As another example, when receiving a signal indicating a pedestrian hazard from the measurement device 210, the control valve 230 may increase volume of the virtual sound by predetermined volume. The measurement device 210 may determine whether a pedestrian is dangerous by means of a sensor or the like.

As another example, the control valve 230 may analyze an image obtained by means of a camera to determine whether a place where the vehicle is traveling is countryside or a city center and may correct volume of the vehicle sound depending on the determined result. For example, when the vehicle is traveling outside the countryside, the control valve 230 may decrease volume of the vehicle sound at a predetermined rate. When the vehicle is traveling on the city center, the control valve 230 may increase volume of the vehicle sound at the predetermined rate.

As another example, the control valve 230 may correct volume of the vehicle sound depending on a driving speed (e.g., idle, a low speed, a high speed, and/or acceleration). For example, when the driving type is an idle or a low speed, the control valve 230 may decrease volume of the vehicle sound in a predetermined unit. Furthermore, when the driving type is a high speed or acceleration, the control valve 230 may increase volume of the vehicle sound in a predetermined unit (or at a predetermined rate).

As another example, the control valve 230 may finally correct a volume adjustment value with regard to volume weight information for each volume class, which is previously stored. For example, when the vehicle class is medium, the control valve 230 may add a volume weight (e.g., +15 dB) corresponding to the volume class to reference volume (e.g., 65 dB) to calculate final volume.

The process 240 may be a control target, which may be an amplification device such as an amplifier. The process 240 may adjust volume of the vehicle sound based on the volume adjustment value input from the control valve 230.

For example, when the accelerator pedal opening amount and a torque fluctuation value according to a driving type are input to the volume control device 200, target sound volume may be determined with reference to a previously stored order table. The feedforward calculator 220 may calculate a volume correction value based on the interior/exterior environment information of the vehicle, which is measured by the measurement device 210. The control valve 230 may adjust a volume adjustment value based on the target sound volume and the volume correction value. The process 240 may control volume of the virtual sound based on the volume adjustment value input from the control valve 230. Referring to FIG. 3, when the sound concept is each of a cultured sound or harmony sound concept, an entertaining sound or fun driving sound concept, and an adaptable sound or context awareness sound concept, the volume control device 200 correct sound volume like graphs 310, 320, and 330. According to the present embodiment, because the sound volume is corrected with regard to volume of background noise by not using an existing noise reduction technology, the sound of the same volume may be provided irrespective of the interior/exterior environment.

Figure 4A:
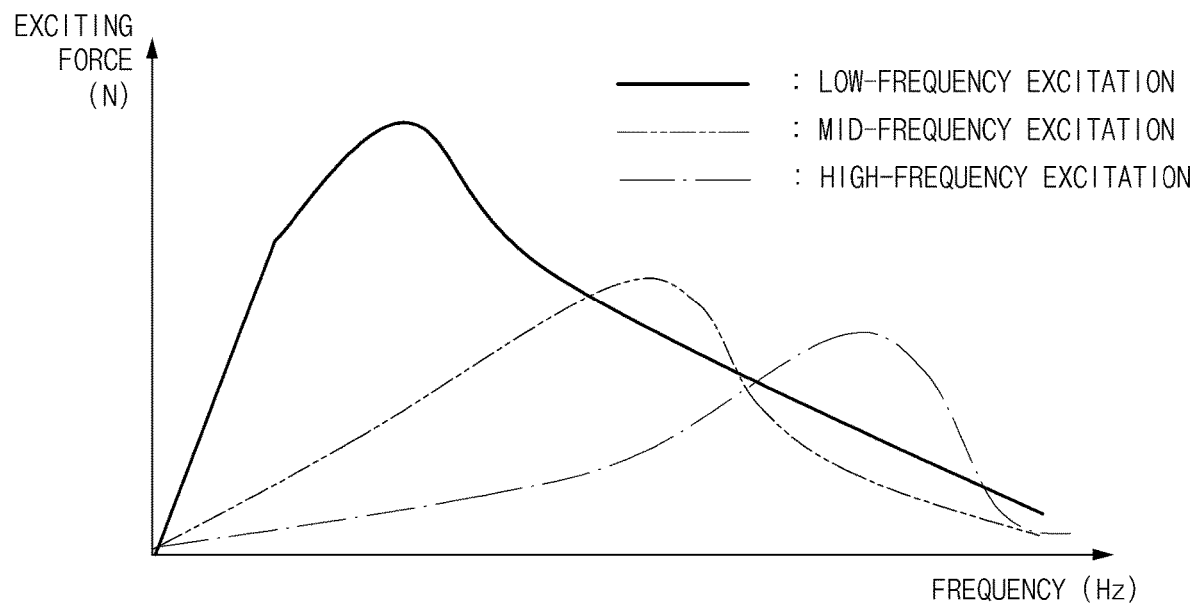
FIGS. 4A and 4B are drawings illustrating sound image control according to embodiments of the present disclosure.
Figure 4B:
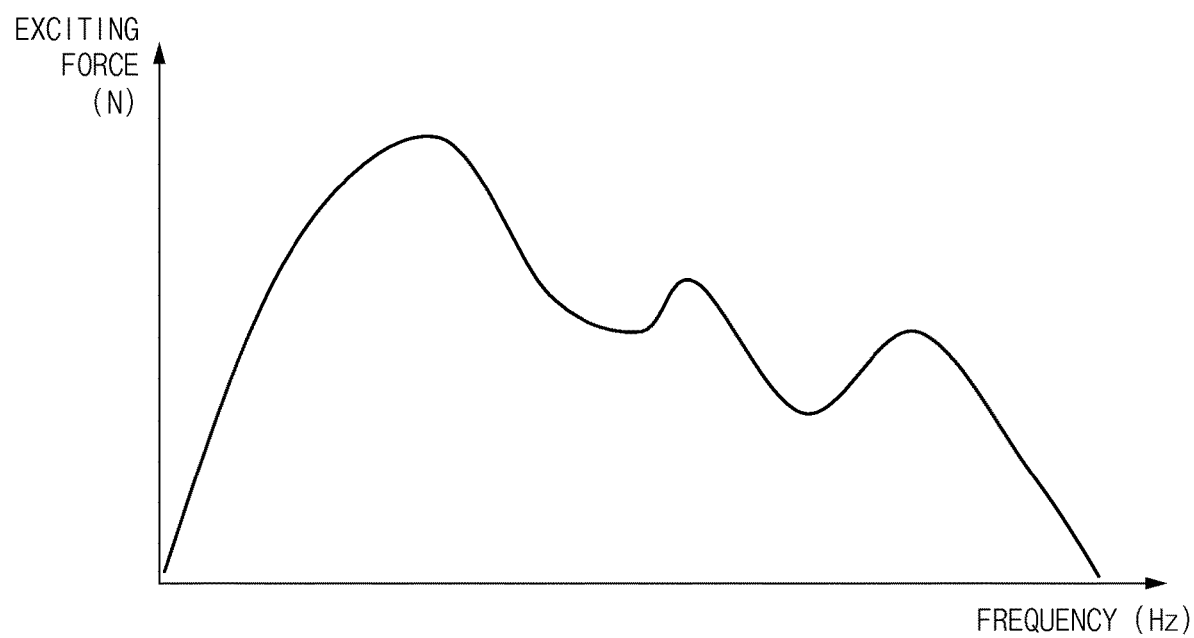
Figure 5:
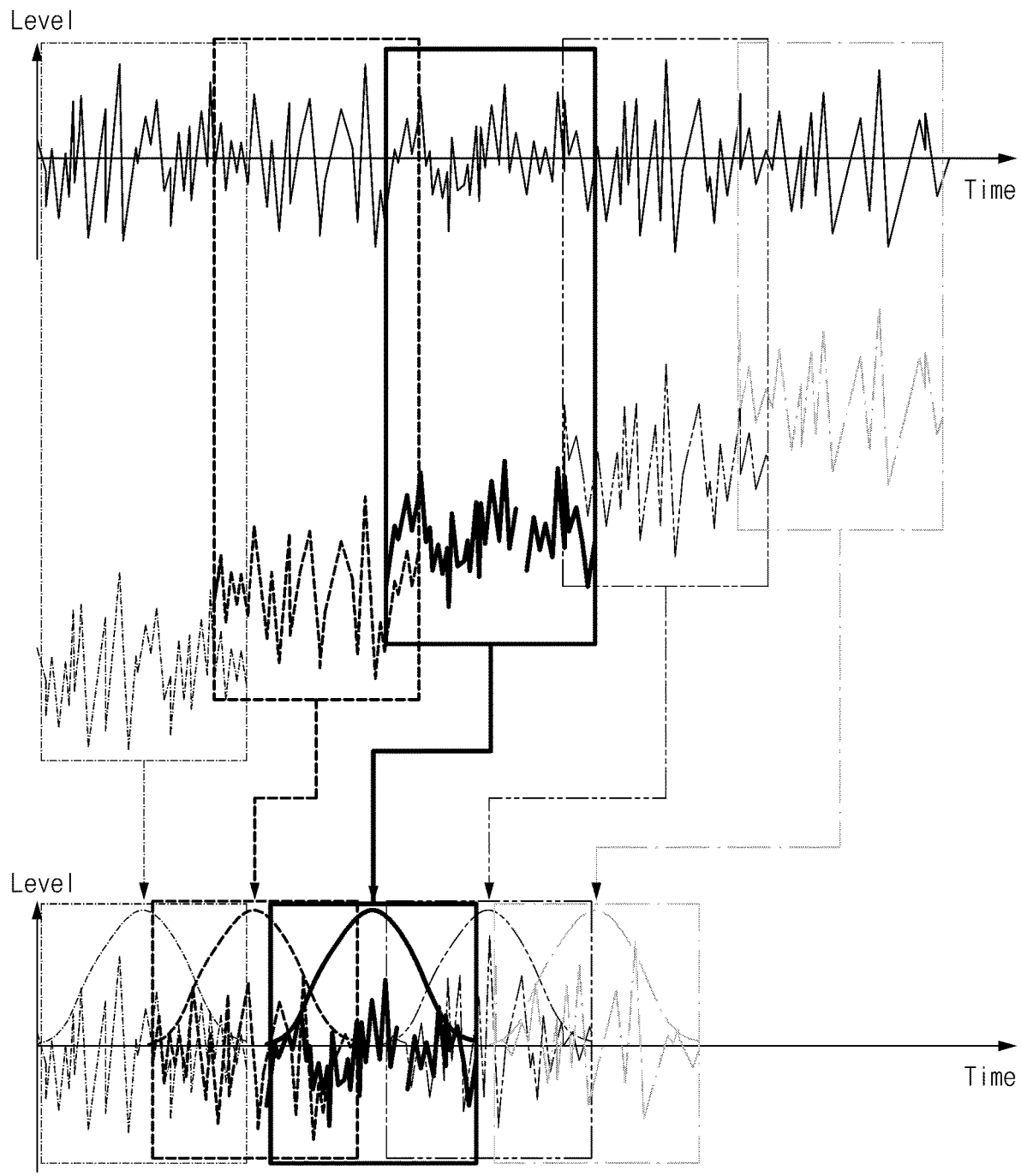
FIG. 5 is a drawing illustrating a sound change according to sound image control according to embodiments of the present disclosure.

FIGS. 4A and 4B are drawings illustrating sound image control according to embodiments of the present disclosure. FIG. 5 is a drawing illustrating a sound change according to sound image control according to embodiments of the present disclosure.

A processing device 170 of FIG. 1 may control a sound image of a vehicle sound using sound image control logic. First of all, the processing device 170 may synthesize sound sources depending on the sound image control logic. As shown in FIG. 4A, the processing device 170 may synthesize low-frequency excitation, mid-frequency excitation, and high-frequency excitation. Next, the processing device 170 may linearize the synthesized sound source. As shown in FIG. 4B, the processing device 170 may linearize the synthesized sound source to broadly implement a sound image felt by a driver. Referring to FIG. 5, an original sound feels like the sound image is concentrated in one place. However, the sound image control sound according to an embodiment of the present disclosure may be implemented as a rich and vivid sound.

Figure 6:
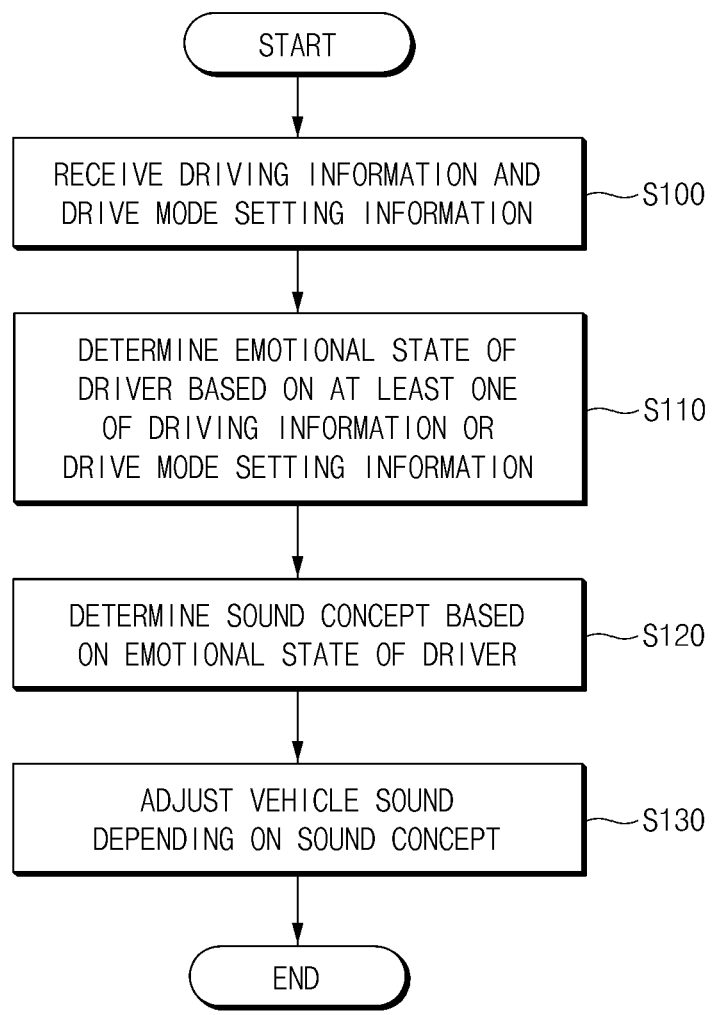
FIG. 6 is a flowchart illustrating a method for controlling a vehicle sound according to embodiments of the present disclosure.

FIG. 6 is a flowchart illustrating a method for controlling a vehicle sound according to embodiments of the present disclosure.

Referring to FIG. 6, in S100, a processing device 170 of an apparatus 100 for controlling a vehicle sound in FIG. 1 may receive driving information and drive mode setting information. The drive mode may be divided into an ECO mode, a COMFORT mode, a SPORTS mode, a SMART mode (or a personalization setting mode), and the like. The processing device 170 may obtain driving information, such as a vehicle speed, motor revolutions per minute (RPM), an accelerator pedal opening amount, accelerator pedal responsiveness, lane departure, vehicle collision, and/or an inter-vehicle distance, by means of a detection device 110 of FIG. 1.

In S110, the processing device 170 may determine an emotional state of a driver based on at least one of the driving information and the drive mode setting information. The processing device 170 may derive driver emotion using a persona technique.

In S120, the processing device 170 may determine a sound concept based on the emotional state of the driver. The processing device 170 may select one of three types of sound concepts using driver emotion modeling. The sound concept based on the driver emotion modeling may be divided into a cultured sound or harmony sound concept, an entertaining sound or fun driving sound concept, an adaptable sound or context awareness sound concept, and/or the like. When the driver selects a drive mode, the processing device 170 may determine a sound concept based on driver emotion modeling corresponding to the selected drive mode. The processing device 170 may determine a sound concept based on the drive mode setting information. For example, when the driver is set to an ECO mode, the processing device 170 may determine that the driver prefers a quiet condition to determine the sound concept as a typical sound or a default sound such that a vehicle may travel in the quiet condition. When the driver is set to a COMFORT mode, the processing device 170 may determine the cultured sound or harmony sound concept as a sound concept. When the drive mode is set to a SPORTS mode, the processing device 170 may determine the entertaining sound or fun driving sound concept as a sound concept. When the drive mode is set to a SMART mode, the processing device 170 may determine the adaptable sound or context awareness sound concept as a sound concept.

In S130, the processing device 170 may adjust a vehicle sound depending on the sound concept. The processing device 170 may control volume, a tone, and/or a sound image of the vehicle sound using volume control logic, tone control logic, and/or sound image control logic.

Figure 7:
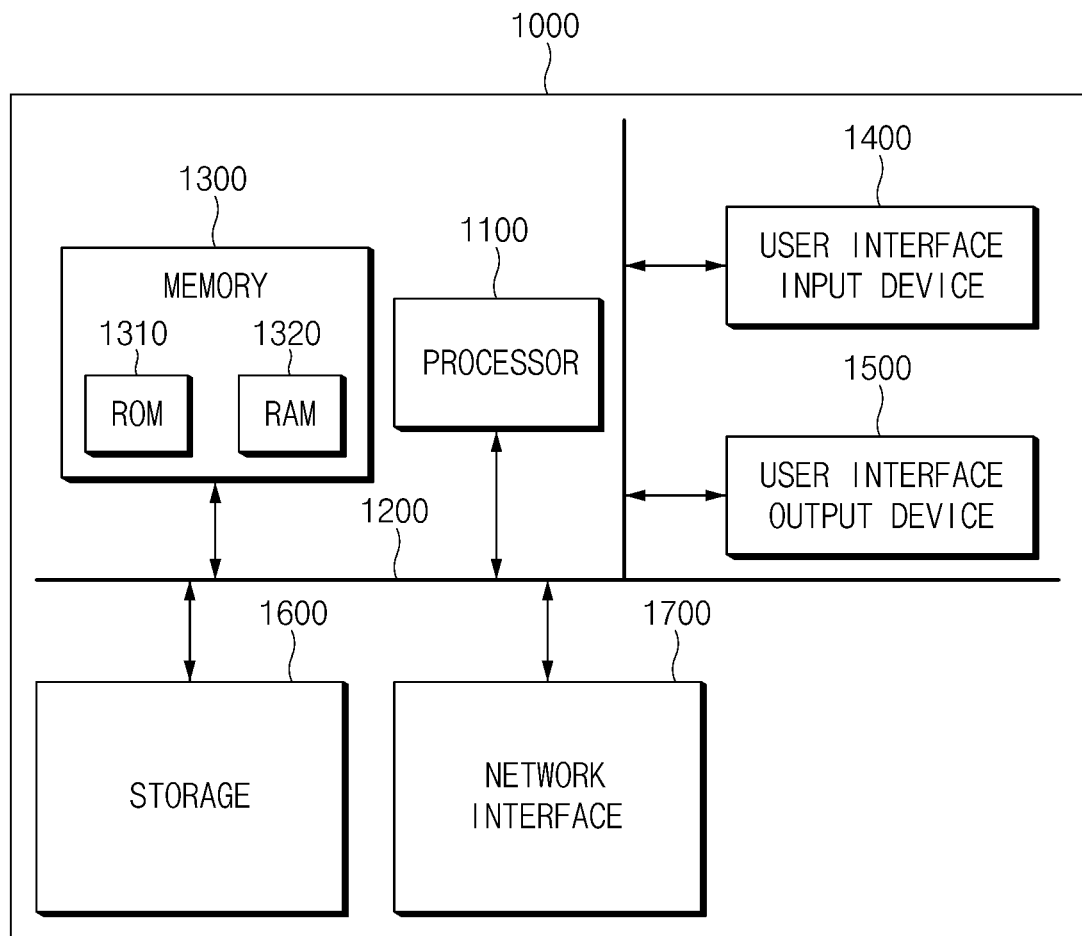
FIG. 7 is a block diagram illustrating a computing system for executing a method for controlling a vehicle sound according to embodiments of the present disclosure.

FIG. 7 is a block diagram illustrating a computing system for executing a method for controlling a vehicle sound according to embodiments of the present disclosure.

Referring to FIG. 7, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100. The processor 1100 may read out information from the storage medium and may write information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to embodiments of the present disclosure, the apparatus for controlling the vehicle sound may actively adjust volume, a tone, and a sound image of the sound based on driving information and driver emotion information, thus providing a driver-customized sound.

Furthermore, according to embodiments of the present disclosure, the apparatus for controlling the vehicle sound may adjust and provide volume, a tone, and a sound image of the sound depending on a change in emotion of the user, thus allowing the user to relax.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present invention are not intended to limit the technical spirit of the present invention, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus for controlling a vehicle sound, the apparatus comprising:
    a detection device configured to detect driving information and drive mode setting information; and
    a processing device electrically connected with the detection device,
    wherein the processing device determines an emotional state of a driver based on at least one of the driving information or the drive mode setting information, determines a sound concept depending on the emotional state of the driver, and controls a vehicle sound depending on the sound concept,
    wherein the processing device adjusts volume of the vehicle sound with regard to a sound pressure difference between the vehicle sound and background noise,
    wherein the processing device controls volume of the vehicle sound based on vehicle environment information, controls a tone of the vehicle sound based on the sound concept, and controls a sound image of the vehicle sound with regard to an exciting force according to a frequency of the vehicle sound,
    wherein the processing device includes:
        a feedforward calculator configured to calculate a volume correction value according to the sound concept and a volume correction value according to the vehicle environment information; and
        a volume control device including a control valve configured to determine a volume adjustment value of the vehicle sound by reflecting the volume correction values, and
    wherein the control valve finally corrects the volume adjustment value with regard to previously stored volume weight information for each vehicle class.

2. The apparatus of claim 1, wherein the sound concept is established as three types based on driver emotion modeling.

3. The apparatus of claim 1, wherein the vehicle sound includes a warning sound and a virtual sound.

4. The apparatus of claim 1, wherein the processing device performs at least one of pitch control, gain control, accelerator position sensor (APS) control, frequency filtering, Shepard layer control, or volume adjustment for the vehicle sound.

5. The apparatus of claim 1, wherein the processing device synthesizes low-frequency excitation, mid-frequency excitation, and high-frequency excitation of a sound source of the vehicle sound and linearizes the synthesized low-frequency excitation, mid-frequency excitation, and high-frequency excitation.

6. The apparatus of claim 1, wherein the processing device generates a tactile signal based on the vehicle sound.

7. A method for controlling a vehicle sound, the method comprising:
    receiving driving information and drive mode setting information;
    determining an emotional state of a driver based on at least one of the driving information or the drive mode setting information;
    determining a sound concept depending on the emotional state of the driver; and
    controlling a vehicle sound depending on the sound concept,
    wherein controlling the vehicle sound includes:
        adjusting volume of the vehicle sound with regard to a sound pressure difference between the vehicle sound and background noise;
        controlling volume of the vehicle sound based on vehicle environment information;
        controlling a tone of the vehicle sound based on the sound concept; and
        controlling a sound image of the vehicle sound with regard to an exciting force according to a frequency of the vehicle sound,
    wherein controlling the volume of the vehicle sound includes:
        calculating, by a feedforward calculator, a volume correction value according to the sound concept and a volume correction value according to the vehicle environment information; and determining, by a control valve, a volume adjustment value of the vehicle sound by reflecting the volume correction values, and wherein the method further comprises:

finally correcting, by the control valve, the volume adjustment value with regard to previously stored volume weight information for each vehicle class.

8. The method of claim 7, wherein the sound concept is established as three types based on driver emotion modeling.

9. The method of claim 7, wherein the vehicle sound includes a warning sound and a virtual sound.

10. The method of claim 7, wherein controlling the tone of the vehicle sound includes:

performing at least one of pitch control, gain control, accelerator position sensor (APS) control, frequency filtering, Shepard layer control, or volume adjustment for the vehicle sound.

11. The method of claim 7, wherein controlling the sound image of the vehicle sound includes:

synthesizing low-frequency excitation, mid-frequency excitation, and high-frequency excitation of a sound source of the vehicle sound; and linearizing the synthesized low-frequency excitation, mid-frequency excitation, and high-frequency excitation.

12. The method of claim 7, wherein controlling the vehicle sound includes:

generating a tactile signal based on the vehicle sound.

* * * * *